(12) United States Patent
Dong et al.

(10) Patent No.: US 9,949,342 B2
(45) Date of Patent: Apr. 17, 2018

(54) BACKLIGHT, CONTROL METHOD THEREOF AND DISPLAY DEVICE

(71) Applicants: BOE Technology Group Co., Ltd., Beijing (CN); Beijing BOE Optoelectronics Technology Co., Ltd., Beijing (CN)

(72) Inventors: Ruijun Dong, Beijing (CN); Haiwei Sun, Beijing (CN); Chenru Wang, Beijing (CN); Lili Chen, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/337,313

(22) Filed: Oct. 28, 2016

(65) Prior Publication Data

US 2017/0196066 A1    Jul. 6, 2017

(30) Foreign Application Priority Data

Jan. 6, 2016   (CN) .......................... 2016 1 0009470

(51) Int. Cl.
*H05B 37/02*     (2006.01)
*G02F 1/1335*    (2006.01)

(52) U.S. Cl.
CPC ....... *H05B 37/0218* (2013.01); *G02F 1/1336* (2013.01)

(58) Field of Classification Search
CPC ................ H05B 37/02; H05B 33/0857; H05B 37/0218; G09G 3/34; G09G 3/3413; G09G 2320/0666; F21Y 2115/10; G02F 1/1336; G02F 1/33602; G02F 1/33603; G02F 2001/133618; G01J 3/10
USPC ........... 315/294, 297, 307, 312; 345/102, 83
See application file for complete search history.

(56) References Cited

U.S. PATENT DOCUMENTS

| | | | | |
|---|---|---|---|---|
| 7,772,788 | B2* | 8/2010 | Park | G09G 3/3413 315/151 |
| 7,777,427 | B2* | 8/2010 | Stalker, III | G05F 1/00 315/291 |
| 8,395,311 | B2* | 3/2013 | Morimoto | F21V 9/10 313/500 |
| 8,434,359 | B2* | 5/2013 | Niemann | B60S 1/087 250/200 |

(Continued)

FOREIGN PATENT DOCUMENTS

| | | |
|---|---|---|
| CN | 201119078 Y | 9/2008 |
| CN | 102404918 A | 4/2012 |

(Continued)

OTHER PUBLICATIONS

May 19, 2017—(CN) First Office Action Appn 201610009470.3 with English Tran.

(Continued)

*Primary Examiner* — Haissa Philogene
(74) *Attorney, Agent, or Firm* — Banner & Witcoff, Ltd.

(57) ABSTRACT

A backlight and a control method for the backlight, and a display device are disclosed; a backlight includes: at least two light sources with different color temperatures and a control module configured to adjust a color temperature of the backlight by respectively controlling a drive current of each light source.

13 Claims, 3 Drawing Sheets

(56) References Cited

U.S. PATENT DOCUMENTS

| | | | |
|---|---|---|---|
| 9,125,274 B1 * | 9/2015 | Brunault | H05B 37/0281 |
| 2006/0056178 A1 | 3/2006 | Len-Li et al. | |
| 2014/0049527 A1 | 2/2014 | Lanzoni et al. | |

FOREIGN PATENT DOCUMENTS

| | | | |
|---|---|---|---|
| CN | 103218980 A | | 7/2013 |
| CN | 103889101 A | | 6/2014 |
| CN | 104103201 A | | 10/2014 |
| EP | 0915363 A2 | | 5/1999 |
| WO | 2008140181 A1 | | 11/2008 |
| WO | 2008153620 A1 | | 12/2008 |

OTHER PUBLICATIONS

Jul. 28, 2017—(CN) Second Office Action Appn 201610009470.3 with English Tran.

* cited by examiner

BACKLIGHT, CONTROL METHOD THEREOF AND DISPLAY DEVICE

This application claims priority to and the benefit of Chinese Patent Application No. 201610009470.3 filed on Jan. 6, 2016, which application is incorporated herein in its entirety.

TECHNICAL FIELD

Embodiments of the present disclosure pertain to a backlight, a control method thereof and a display device.

BACKGROUND

Liquid crystal displays (LCDs) have been widely applied in devices such as computer monitors, notebook computers, mobile phones and LCD TVs due to the advantages of small size, low power, low radiation, etc. A conventional LCD mainly comprises an LCD panel and a backlight. As the LCD panel cannot emit light, it is necessary to rely on the backlight to provide a light source for display operation.

However, after the manufacturing process of the LCD, the color temperature of a backlight is fixed, the color temperature of the LCD comprising the backlight is mainly adjusted by adjusting the deflection of liquid crystal molecules corresponding to monochromatic sub-pixel units such as red (R), green (G) and blue (B) sub-pixels in the LCD panel via software means. But the adjustment method will significantly affect the transmittance ratio of the LCD panel. For instance, in general, when the variation of the color temperature reaches about 1,000 K, the transmittance ratio will be reduced by 10%, and hence the overall image quality of the display can be severely affected.

SUMMARY

At least an embodiment of the present disclosure provides a backlight and a control method for the backlight, and a display device comprising the backlight, which can avoid the reduction of transmittance ratio of an LCD for example during changing the color temperature of the LCD.

In the first aspect, an embodiment of the disclosure provides a backlight, comprising: at least two light sources with different color temperatures; and a control module configured to adjust a color temperature of the backlight by respectively controlling a drive current of each light source.

In a second aspect, another embodiment of the disclosure provides a display device comprising the above backlight.

In a third aspect, still another embodiment of the disclosure provides control method of a backlight, the backlight including a control module and at least two light sources with different color temperatures, and the control method comprise: allowing the control module to adjust a color temperature of the backlight by respectively controlling a drive current of each light source.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
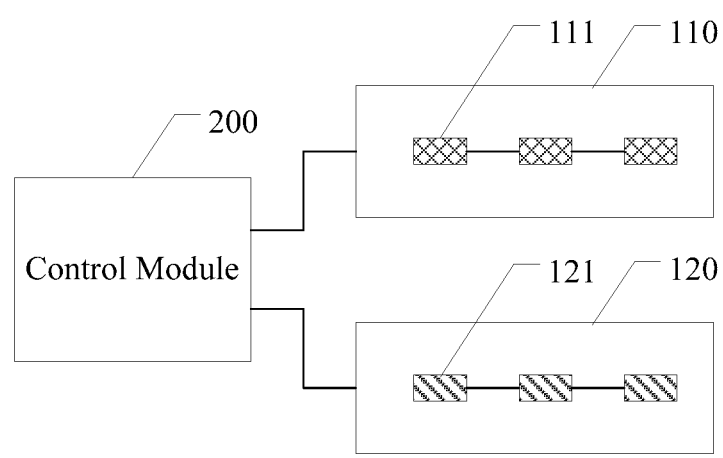
FIG. 1 is a schematic diagram of a backlight provided by an embodiment of the present disclosure.

Further detailed description will be given below to the preferred embodiments of the present disclosure with reference to the accompanying drawings and the embodiments. The following embodiments are used for illustrating the present disclosure but not intended to limit the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An embodiment of the present disclosure provides a backlight (i.e., backlight module), which comprises: at least two light sources with different color temperatures; and a control module configured to adjust the color temperature of the backlight by respectively controlling the drive current of each light source.

As described above, in the backlight provided by the embodiment of the present disclosure, the color temperature of the backlight can be adjusted by providing at least two light sources with different color temperatures and allowing the control module to respectively control the drive current of each light source. When the backlight is applied in an LCD, the color temperature of the LCD can be changed without changing the transmittance ratio of the LCD, and hence the disadvantageous influence on the image quality can be alleviated or avoided.

The at least two light sources with different color temperatures are divided in different sets, and each set include the light source(s) having the same color temperature.

In some examples, the light sources may be light-emitting diode (LEDs) or LED lamps; alternatively, the light sources may be cold cathode fluorescent lamp (CCFL). For instance, at least two light-emitting drive circuits may be disposed in the backlight; each light-emitting drive circuit includes a plurality of light sources being in a series connection and having a same color temperature; and the light sources in different light-emitting drive circuits have different color temperatures. The at least two light-emitting drive circuits may be in a parallel connection, or may be not connected with each other and thus be independent of each other. No specific limitation will be given here in the embodiment of the present disclosure. In addition, the current difference between different light sources with different color temperatures shall not be too large, so that the hotspot phenomenon can be avoided.

As illustrated in FIG. 1 which is a schematic diagram of an exemplary backlight provided by an embodiment of the present disclosure, the backlight comprises a control module 200 and at least two light-emitting drive circuits 110 and 120.

The light-emitting drive circuit 110 includes a plurality of light sources 111 in a series connection, and the light-emitting drive circuit 120 includes a plurality of light sources 121 in a series connection. The light sources 111 and the light sources 121 have different color temperatures. For instance, the light sources 111 may be yellowish light sources, and the light source 121 may be bluish light sources.

The control module 200 is respectively connected with the light-emitting drive circuit 110 and the light-emitting drive circuit 120. The color temperature of the backlight is adjusted by respectively controlling the drive currents for the light-emitting drive circuit 110 and the light-emitting drive circuit 120. For instance, the color temperature of the light source 111 is less than that of the light source 121. In the case of not changing the overall brightness of the light emitted by the backlight, when the color temperature of the backlight must be increased, the drive current of the light sources 121 can be increased and meanwhile the drive current of the light sources 111 can be reduced; and when the color temperature of the backlight must be reduced, the drive current of the light sources 111 can be increased and meanwhile the drive current of the light sources 121 can be reduced.

In some examples, for the automatic adjustment of the backlight according to ambient light, the backlight may further comprise a light sensor. The light sensor may be configured to acquire spectroscopic data and brightness data of the ambient light, and the control module is configured to control the drive current of each light source according to the spectroscopic data and the brightness data of the ambient light acquired by the light sensor, so that the overall color temperature and the overall brightness of the light emitted by the backlight can be consistent with the color temperature and the brightness of the current ambient light, and hence the display effect can be improved.

Figure 2:
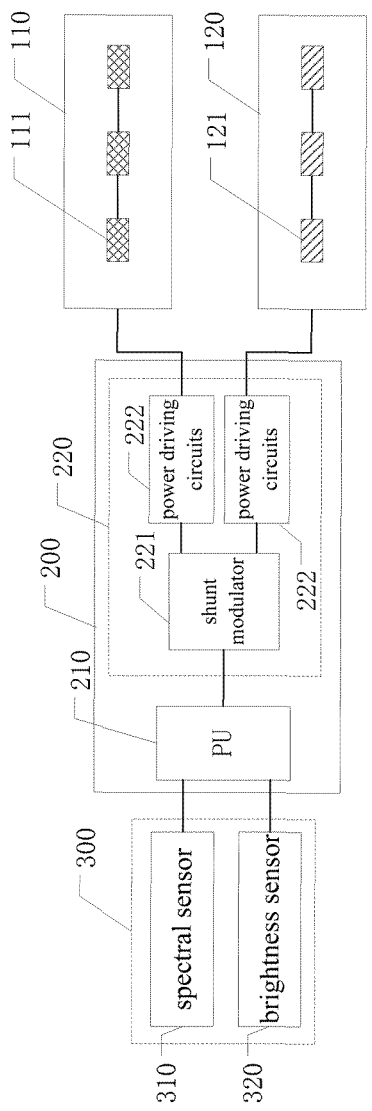
FIG. 2 is a schematic diagram of another backlight provided by an embodiment of the present disclosure.

As illustrated in FIG. 2 which is a schematic diagram of another backlight provided by the embodiment of the present disclosure, the backlight comprises two light-emitting drive circuits 110 and 120, a control module 200 and a light sensor 300.

The light-emitting drive circuit 110 includes a plurality of light sources 111 in a series connection, and the light-emitting drive circuit 120 includes a plurality of light sources 121 in a series connection. The light sources 111 and the light sources 121 have different color temperature.

The light sensor 300 includes a spectral sensor 310 and a brightness sensor 320. The spectral sensor 310 is configured to acquire spectroscopic data of ambient light. The brightness sensor 320 is configured to acquire brightness data of the ambient light.

The control module 200 is configured to control the drive current of each light source according to the spectroscopic data and the brightness data of the ambient light acquired by the light sensor 300. The control module 200 may include a processing unit (PU) 210 and a power supply unit 220.

The processing unit 210 is configured to determine the color temperature of the backlight for a display panel's display operation according to the spectroscopic data of the ambient light acquired by the light sensor 300, determine the power of the backlight according to the brightness data of the ambient light, and send a control signal to the power supply unit 220 according to the color temperature to be presented of the backlight and the power of the backlight. For instance, the processing unit 210 may be a central processing unit (CPU), a programmable logic controller (PLC), or the like.

The power supply unit 220 is configured to control the drive current of each light source according to the control signal sent by the processing unit 210. The power supply unit 220 includes a shunt modulator 221 and power driving circuits (e.g., ICs) 222 (e.g., two power ICs in the example) which are respectively applied for the light-emitting drive circuits 110 and 120. The shunt modulator 221 controls each power ICs 222 to supply electricity for the light-emitting drive circuit corresponding to each power IC according to the control signal sent by the processing unit 210. Thus, the color temperature and the brightness of overall light emitted by the backlight can be consistent with the color temperature and the brightness of the ambient light.

For instance, in the backlight provided by the embodiment of the present disclosure, the light sensor 300 may acquire the spectroscopic data and the brightness data of the ambient light in real time; the processing unit 210 determines the color temperature of the ambient light according to the acquired spectroscopic data, applies the determined color temperature for the color temperature to be presented of the backlight, calculates the ratio of the drive current of the light-emitting drive circuit 110 to the drive current of the light-emitting drive circuit 120 according to the color temperature, determines the power of the backlight according to the acquired brightness data (for instance, the sum of the drive current of the light-emitting drive circuit 110 and the drive current of the light-emitting drive circuit 120 is calculated), and sends the control signal including the above-mentioned information to the power supply unit 220; and the power supply unit 220 drives each light-emitting drive circuit 110 and 120 according to the received control signal to operate respectively.

In the embodiment of the present disclosure, the processing unit 210 can have a plurality of ways for determining the color temperature to be presented of the backlight according to the spectroscopic data of the ambient light. For instance, the processing unit 210 can calculate the color temperature to be presented of the backlight according to the spectroscopic data of the ambient light acquired by the light sensor 300. For instance, colorimetry may be adopted. Firstly, corresponding tristimulus values are calculated according to the spectroscopic data; secondly, corresponding chromaticity coordinate is calculated according to the calculated tristimulus values; and thirdly, the color temperature is calculated according to the chromaticity coordinate. Generally, three values are used to describe a color sensation, and these three values are called the tristimulus values of a color. The tristimulus values are usually given in the X, Y and Z values of the CIE color space.

In addition, the processing unit 210 may also determine the color temperature to be presented of the backlight by searching or querying in a preset table. For instance, a storage unit may be additionally arranged in the control module 200 and is configured to store information corresponding to relationship between spectroscopic data and color temperatures. The processing unit 210 searches for corresponding color temperature from the storage unit according to the spectroscopic data of the ambient light acquired by the light sensor 300 and uses the searched color temperature as the color temperature to be presented of the backlight.

For instance, the storage unit may include a first storage subunit and a second storage subunit. The first storage subunit is configured to store the information corresponding to relationship between the spectroscopic data of natural light (sun light) and the color temperatures of natural light, and the second storage subunit is configured to store the information corresponding to relationship between the spectroscopic data of unnatural light and the color temperatures of unnatural light. The processing unit 210 first determines whether the ambient light is natural light or not, and searches for a corresponding color temperature from the first storage subunit to be the color temperature to be presented of the backlight if the ambient light is natural light, but searches for a corresponding color temperature from the second storage subunit to be the color temperature to be presented of the backlight if the ambient light is not natural light. For instance, the spectroscopic data of natural light in the early morning, at noon, in the early evening, at night or the like and the spectroscopic data of various light sources may be pre-determined and preset. On this basis, the processing unit 210 determines the current time in operation (e.g., in the early morning, at noon, in the early evening or at night) according to a system clock, obtains the spectroscopic data of the natural light at the current time by searching from the preset spectroscopic data, compares the spectroscopic data acquired by the light sensor 300 with the searched spectroscopic data, and hence can determine whether the acquired ambient light is natural light or not and determine whether the environment is indoors or outdoors. In addition, if the ambient light is unnatural light, that the ambient light is emitted by which kind of light source can also be determined according to the preset spectroscopic data of various light sources.

Figure 3:
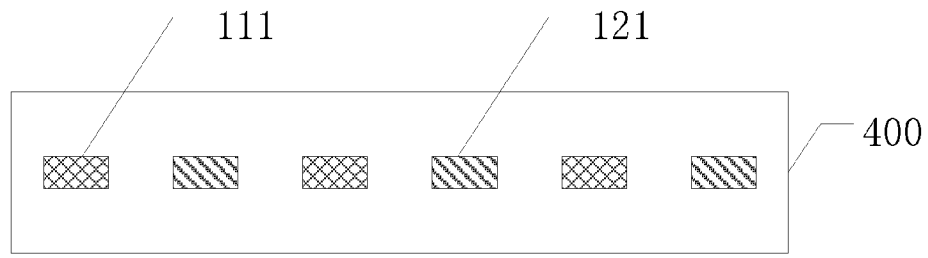
FIG. 3 is a schematic diagram illustrating the arrangement of a plurality of light sources with different color temperatures in the embodiment of the present disclosure.

In addition, in some examples, in order to improve the uniformity of the overall light emitted by the backlight, the light sources with different color temperatures can be arranged in different patterns. For instance, the light sources with different color temperatures may be uniformly distributed on a mounting substrate of the backlight in staggered form. For instance, as illustrated in FIG. 3, the plurality of light sources 111 and the plurality of light sources 121 are alternately disposed on the mounting element 400 to form a light bar structure.

In addition, in some examples, in order to increase the adjustable range of the color temperature of the backlight, the number of the kinds of the light sources with different color temperatures in the backlight can be appropriately added. For instance, three or four kinds of light sources with different color temperatures may be arranged in the backlight, so that the image chromaticity of the display device can be better adjusted.

As described above, in the backlight provided by the embodiment of the present disclosure, the color temperature of the backlight can be adjusted by arranging at least two light sources with different color temperature and allowing the control module to respectively control the drive current of each light source. When the backlight is applied in an LCD, the color temperature can be adjusted without adjusting the deflection of liquid crystal molecules in the LCD, and hence the reduced transmittance in connection with changing of color temperature can be avoided.

The embodiment of the present disclosure further provides a display device, which comprises the backlight provided by any of foregoing embodiments. In the illustrative but non-limiting examples, the display device provided by the embodiment of the present disclosure may be any product or component with display function such as a notebook computer display, an LCD monitor, an LCD TV, a digital picture frame, a mobile phone or a tablet PC.

In addition, the embodiment of the present disclosure further provides a control method of a backlight, e.g., the backlight of an LCD. The backlight includes a control module and at least two light sources with different color temperature. The control method comprises: allowing the control module to adjust the color temperature of the backlight by respectively controlling the drive current of each light source.

Figure 4:
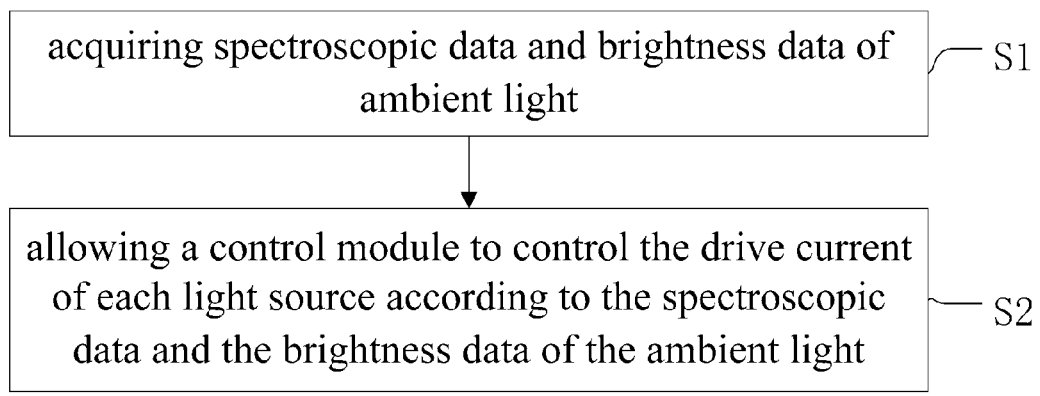
FIG. 4 is a flowchart of a control method of a backlight provided by an embodiment of the present disclosure.

As illustrated in FIG. 4 which is a flowchart of a control method of a backlight provided by the embodiment of the present disclosure, the control method comprises the following operations:

S1: acquiring spectroscopic data and brightness data of ambient light; and

S2: allowing a control module to control the drive current of each light source according to the spectroscopic data and the brightness data of the ambient light.

In an example, the step S2 may further include: allowing the control module to determine the color temperature to be presented of the backlight according to the spectroscopic data of the ambient light, determine the power of the backlight according to the brightness data of the ambient light, and control the drive current of light sources with each color temperature according to the color temperature to be presented of the backlight and the power of the backlight.

Other exemplary operations in the control method of a backlight provided by the embodiment of the present disclosure can be referred to the above description of the backlight.

What are described above is related to the illustrative embodiments of the disclosure only and not limitative to the scope of the disclosure; the scopes of the disclosure are defined by the accompanying claims.

The application claims priority to the Chinese patent application No. 201610009470.3, filed on Jan. 6, 2016, the entire disclosure of which is incorporated herein by reference as part of the present application.

What is claimed is:

1. A backlight, comprising:
    at least two light sources with different color temperatures;
    a light sensor, configured to acquire spectroscopic data and brightness data of ambient light; and
    a control module, configured to adjust a color temperature of the backlight by respectively controlling a drive current of each light source according to the spectroscopic data and the brightness data of the ambient light acquired by the light sensor.

2. A display device, comprising the backlight according to claim 1.

3. The backlight according to claim 1, wherein the control module includes a processing unit and a power supply unit;
    the processing unit is configured to determine the color temperature of the backlight to be presented according to the spectroscopic data of the ambient light acquired by the light sensor, determine a power of the backlight according to the brightness data of the ambient light, and send a control signal to the power supply unit according to the color temperature of the backlight to be presented and the power of the backlight; and the power supply unit is configured to respectively control the drive current of each light source according to the control signal sent by the processing unit.

4. The backlight according to claim 3, wherein the processing unit is configured to calculate the color temperature of the backlight to be presented according to the spectroscopic data of the ambient light acquired by the light sensor.

5. The backlight according to claim 3, wherein the control module further includes a storage unit which is configured to store information corresponding to a relationship between spectroscopic data and color temperatures; and the processing unit is configured to search for a corresponding color temperature from the storage unit as the color temperature of the backlight to be presented according to the spectroscopic data of the ambient light acquired by the light sensor.

6. The backlight according to claim 5, wherein the storage unit includes a first storage subunit and a second storage subunit, the first storage subunit to store information corresponding to relationship between spectroscopic data of natural light and color temperatures of natural light, and the second storage subunit is configured to store information corresponding to relationship between spectroscopic data of unnatural light and color temperatures of unnatural light; and the processing unit is configured to determine whether the ambient light is natural light or not, search for corresponding color temperature from the first storage subunit as the color temperature of the backlight to be presented if the ambient light is natural light, and search for corresponding color temperature from the second storage subunit as the color temperature of the backlight to be presented if the ambient light is unnatural light.

7. The backlight according to claim 1, comprising at least two light-emitting drive circuits, wherein each light-emitting drive circuit includes a plurality of light sources in a series connection and having a same color temperature, and the light sources in different light-emitting drive circuits have different color temperatures.

8. The backlight according to claim 7, further comprising a mounting element for mounting the light sources, wherein the light sources with different color temperatures are uniformly distributed on the mounting element in staggered form.

9. A control method of a backlight, the backlight including a control module and at least two light sources with different color temperatures, the control method comprising:

acquiring spectroscopic data and brightness data of ambient light; and allowing the control module to adjust a color temperature of the backlight by respectively controlling a drive current of each light source according to the spectroscopic data and the brightness data of the ambient light.

10. The control method of the backlight according to claim 9, wherein the allowing the control module to respectively control the drive current of each light source according to the spectroscopic data and the brightness data of the ambient light includes:

allowing the control module to determine the color temperature of the backlight to be presented according to the spectroscopic data of the ambient light;

determining a power of the backlight according to the brightness data of the ambient light; and respectively controlling the drive current of each light source according to the color temperature of the backlight to be presented and the power of the backlight.

11. The control method of the backlight according to claim 10, wherein the determining the color temperature of the backlight to be presented according to the spectroscopic data of the ambient light includes:

pre-storing information corresponding to a relationship between spectroscopic data and color temperatures; and searching for a corresponding color temperature from the pre-stored information corresponding to the relationship between the spectroscopic data and the color temperatures as the color temperature of the backlight to be presented according to the spectroscopic data of the ambient light.

12. The control method of the backlight according to claim 11, wherein the pre-stored information corresponding to the relationship between the spectroscopic data and the color temperatures includes:

information corresponding to a relationship between spectroscopic data of natural light and color temperatures of natural light; and information corresponding to a relationship between spectroscopic data of unnatural light and color temperatures of unnatural light; and the control method further comprises:

determining whether the ambient light is natural light or not.

13. The control method of the backlight according to claim 10, wherein the determining the color temperature of the backlight to be presented according to the spectroscopic data of the ambient light includes:

calculating the color temperature of the backlight to be presented by colorimetry according to the spectroscopic data.

* * * * *